(12) United States Patent
Sekime

(10) Patent No.: US 7,583,343 B2
(45) Date of Patent: Sep. 1, 2009

(54) LIQUID CRYSTAL DISPLAY DEVICE AND ELECTRONIC APPARATUS

(75) Inventor: Tomoaki Sekime, Suwa (JP)

(73) Assignee: Seiko Epson Corporation (JP)

( * ) Notice: Subject to any disclaimer, the term of this patent is extended or adjusted under 35 U.S.C. 154(b) by 554 days.

(21) Appl. No.: 11/065,749

(22) Filed: Feb. 25, 2005

(65) Prior Publication Data

US 2005/0190328 A1 Sep. 1, 2005

(30) Foreign Application Priority Data

| Feb. 26, 2004 | (JP) | ............................ 2004-051667 |
| Nov. 9, 2004 | (JP) | ............................ 2004-324748 |

(51) Int. Cl.
*G02F 1/1335* (2006.01)

(52) U.S. Cl. ..................... 349/119; 349/117; 349/118

(58) Field of Classification Search ................. 349/114, 349/117–119
See application file for complete search history.

(56) References Cited

U.S. PATENT DOCUMENTS

| 5,139,340 | A | 8/1992 | Okumura | |
| 6,307,608 | B1 | 10/2001 | Sakamoto | |
| 6,411,355 | B1 * | 6/2002 | Manabe et al. | ............... 349/120 |
| 6,771,334 | B2 | 8/2004 | Kubota | |
| 6,801,283 | B2 * | 10/2004 | Koyama et al. | ............ 349/119 |
| 6,816,217 | B2 * | 11/2004 | Sone | .......................... 349/114 |
| 2001/0030726 | A1 * | 10/2001 | Yoshida et al. | .............. 349/117 |
| 2004/0233362 | A1 * | 11/2004 | Kashima | ...................... 349/117 |
| 2005/0041180 | A1 * | 2/2005 | Ozawa | ......................... 349/98 |
| 2005/0057704 | A1 * | 3/2005 | Ootake et al. | ................ 349/69 |
| 2005/0087704 | A1 | 4/2005 | Funakoshi et al. | |
| 2006/0072054 | A1 * | 4/2006 | Ito | ............................. 349/96 |
| 2006/0114385 | A1 * | 6/2006 | Ito et al. | ..................... 349/119 |

FOREIGN PATENT DOCUMENTS

| CN | 1053302 | 7/1991 |
| CN | 1281157 | 1/2001 |
| CN | 1392964 | 1/2003 |

(Continued)

OTHER PUBLICATIONS

Communication from Japanese Patent Office regarding related application.

*Primary Examiner*—David Nelms
*Assistant Examiner*—Thanh-Nhan P Nguyen
(74) *Attorney, Agent, or Firm*—Harness, Dickey & Pierce, P.L.C.

(57) ABSTRACT

The liquid crystal display device includes a liquid crystal cell having a nematic liquid crystal layer, upper and lower retardation plates sandwiching the liquid crystal cell, an upper polarizer above the upper retardation plate, and a lower polarizer below the lower retardation plate. The nematic liquid crystal layer is arranged at the upper and lower substrates with the twist angle set in a range of 0° to 70° which is subjected to a rubbing process at a predetermined angle relative to a reference direction. The lower retardation plate has a first lower retardation plate of a discotic liquid crystal film with hybrid alignment, and a second lower retardation plate of a polymer film having a three-dimensional refractive index anisotropy. The three-dimensional refractive index of the second lower retardation plate is set in a range of −0.7 to 0.7.

9 Claims, 14 Drawing Sheets

FOREIGN PATENT DOCUMENTS

| | | |
|---|---|---|
| JP | 05-100114 | 4/1993 |
| JP | 9-203895 | 8/1997 |
| JP | 10-033314 | 2/1998 |
| JP | 10-186356 | 7/1998 |
| JP | 10-206637 | 8/1998 |
| JP | 2002-182036 | 6/2002 |
| JP | 2003-090914 | 3/2003 |
| JP | 2003-322855 | 11/2003 |
| WO | 03/085949 | 10/2003 |

* cited by examiner

50: LIQUID CRYSTAL MOLECULE

54: LIQUID CRYSTAL FILM
50: LIQUID CRYSTAL MOLECULE

VIEW SEEN FROM THE TOP

12: LIQUID CRYSTAL LAYER
54: LIQUID CRYSTAL FILM
59: HIGH-MOLECULAR-WEIGHT FILM

COMPENSATE FOR TILT OF LIQUID CRYSTAL LAYER

FIG. 11A

| | PREFERRED RANGE | | MORE PREFERRED RANGE | |
|---|---|---|---|---|
| | ANGLE | PHASE DIFFERENCE VALUE | ANGLE | PHASE DIFFERENCE VALUE |
| UPPER POLARIZING PLATE 2 | -80 DEG.<φpu<80 DEG. | — | 15 DEG. | — |
| UPPER RETARDATION PLATE 3a | -60 DEG.<φF1<60 DEG. | 220nm<RF3a<290nm | 30 DEG. | 260nm |
| UPPER RETARDATION PLATE 3b | 45 DEG.<φF2<35 DEG. | 50nm<RF3b<140nm | 90 DEG. | 90nm |
| LIQUID CRYSTAL LAYER — UPPER | 80 DEG.<φLCu<130 DEG. | 220nm<Δnd<350nm | 90 DEG. | REFLECTED 163nm |
| LIQUID CRYSTAL LAYER — LOWER | 230 DEG.<φLCd<270 DEG. | | 270 DEG. | TRANSMITTED 325nm |
| LOWER RETARDATION PLATE 5a | 85 DEG.<φF3<95 DEG. | 10nm<RF5a<40nm | 90 DEG. | 26nm |
| LOWER RETARDATION PLATE 5b | 85 DEG.<φF4<95 DEG. | 80nm<RF5b<150nm | 90 DEG. | 130nm |
| LOWER RETARDATION PLATE 5c | -60 DEG.<φF5<60 DEG. | 220nm<RF5c<290nm | 150 DEG. (-30 DEG.) | 270nm |
| LOWER POLARIZING PLATE 7 | 45 DEG.<φpd<135 DEG. | — | 75 DEG. | — |

FIG. 11B

| | PREFERRED RANGE | | MORE PREFERRED RANGE | |
|---|---|---|---|---|
| | ANGLE | PHASE DIFFERENCE VALUE | ANGLE | PHASE DIFFERENCE VALUE |
| UPPER POLARIZING PLATE 2 | −80 DEG.<φpu<80 DEG. | — | 15 DEG. | — |
| UPPER RETARDATION PLATE 3c | −60 DEG.<φF6<60 DEG. | 100nm<RF3c<200nm | 50 DEG. | 170nm |
| LIQUID CRYSTAL LAYER UPPER | 80 DEG.<φLCu<130 DEG. | 220nm<Δnd<350nm | 90 DEG. | REFLECTED 163nm |
| LIQUID CRYSTAL LAYER LOWER | 230 DEG.<φLCd<270 DEG. | | 270 DEG. | TRANSMITTED 325nm |
| LOWER RETARDATION PLATE 5a | 85 DEG.<φF3<95 DEG. | 10nm<RF5a<40nm | 90 DEG. | 26nm |
| LOWER RETARDATION PLATE 5b | 85 DEG.<φF4<95 DEG. | 80nm<RF5b<150nm | 90 DEG. | 130nm |
| LOWER RETARDATION PLATE 5c | −60 DEG.<φF5<60 DEG. | 220nm<RF5c<290nm | 150 DEG. (−30 DEG.) | 270nm |
| LOWER POLARIZING PLATE 7 | 45 DEG.<φpd<135 DEG. | — | 75 DEG. | — |

FIG. 11C

| | PREFERRED RANGE | | MORE PREFERRED RANGE | |
|---|---|---|---|---|
| | ANGLE | PHASE DIFFERENCE VALUE | ANGLE | PHASE DIFFERENCE VALUE |
| UPPER POLARIZING PLATE 2 | -80 DEG.<φpu<80 DEG. | — | 15 DEG. | — |
| UPPER RETARDATION PLATE 3d | -60 DEG.<φF7<60 DEG. | 220nm<RF3d<290nm | 30 DEG. | 265nm |
| UPPER RETARDATION PLATE 3e | 45 DEG.<φF8<135 DEG. | 50nm<RF3e<140nm | 90 DEG. | 130nm |
| UPPER RETARDATION PLATE 3f | 45 DEG.<φF9<135 DEG. | 10nm<RF3f<40nm | 90 DEG. | 30nm |
| LIQUID CRYSTAL LAYER UPPER | 80 DEG.<φLCu<130 DEG. | 220nm<Δnd<350nm | 90 DEG. | REFLECTED 163nm |
| LIQUID CRYSTAL LAYER LOWER | 230 DEG.<φLCd<270 DEG. | | 270 DEG. | TRANSMITTED 325nm |
| LOWER RETARDATION PLATE 5a | 85 DEG.<φF3<95 DEG. | 10nm<RF5a<40nm | 90 DEG. | 26nm |
| LOWER RETARDATION PLATE 5b | 85 DEG.<φF4<95 DEG. | 80nm<RF5b<150nm | 90 DEG. | 130nm |
| LOWER RETARDATION PLATE 5c | -60 DEG.<φF5<60 DEG. | 220nm<RF5c<290nm | 150 DEG. (-30 DEG.) | 270nm |
| LOWER POLARIZING PLATE 7 | 45 DEG.<φpd<135 DEG. | — | 75 DEG. | — |

LIQUID CRYSTAL DISPLAY DEVICE AND ELECTRONIC APPARATUS

RELATED APPLICATIONS

This application claims priority to Japanese Patent Application Nos. 2004-051667 filed Feb. 26, 2004 and 2004-324748 filed Nov. 9, 2004 which are hereby expressly incorporated by reference herein in their entirety.

BACKGROUND

1. Technical Field

The present invention relates to a transflective liquid crystal display device capable of performing display in a transmitting mode and a reflecting mode, and an electronic apparatus using the same.

2. Related Art

An active driven twisted nematic (TN) liquid crystal display device has several advantages of thin size, light-weight, and low power consumption, so that it is widely employed as a display device of a portable telephone, a notebook computer, a portable television, a portable digital assistant (PDA), etc.

However, in the conventional twisted nematic liquid crystal display device, there exists a problem in a viewing angle that causes a display color to be changed or a display contrast to be degraded when the liquid crystal display device is viewed in a tilted angle due to a refractive index anisotropy of the liquid crystal molecule. That is, when a voltage is applied to a liquid crystal layer, the liquid crystal molecule is almost vertically aligned to show a positive one axial property, but a twisted angle has an S-shaped distribution, and the liquid crystal molecule is not significantly tilted near each surface of upper and lower substrates due to an effect of the alignment regulating force of the substrate surface. As a result, the configuration of the liquid crystal molecule when a voltage is applied thereto is differently shown depending on the angle of viewing the liquid crystal display device and its azimuth.

This is why improvement of the viewing angle problem is strongly desired in the liquid crystal display device, and various attempts are made for the improvement. As a representative method thereof, a method is disclosed which does not change the structure of the liquid crystal display device at all, but has an optical compensation film as a retardation plate incorporated into the conventional twisted nematic liquid crystal display device so as to increase the viewing angle.

A method of fabricating an optical compensation film used as the above-mentioned optical compensation film has been proposed, wherein the film is formed of a liquid crystalline polymer representing a positive one axial property optically and has fixed a nematic hybrid alignment which was formed in a liquid crystal state. This method has an advantage of cost effective production because it does not require fabrication equipment for the liquid crystal display device to be improved or additionally.

However, among various liquid crystal display devices, in a transflective liquid crystal display device in which a partially reflecting layer is interposed between a nematic liquid crystal layer and a lower polarizer, there occurs a problem that the amount of display light or contrast is not sufficient in a transmitting mode even though an optical compensation film functioning as the retardation plate is disposed. Thus, there exists a case that a plurality of retardation plates more than four is employed, however, which causes the cost to be increased and the display performance to be degraded due to a variation of the phase retardation axis of each retardation plate.

Accordingly, the present invention has been made in consideration of the above circumstances, and it is an object of the present invention to provide a liquid crystal display device capable of improving the contrast or the amount of display light in a transmitting mode by using an optimized optical compensation film, and an electronic apparatus using the same.

SUMMARY

In one aspect of the present invention, a liquid crystal display device includes: a lower polarizer; a lower retardation plate formed above the lower polarizer, the lower retardation plate having a first lower retardation plate made of a discotic liquid crystal film with hybrid alignment and a second lower retardation plate made of a polymer film having a three-dimensional refractive index anisotropy, the second lower retardation plate being disposed below the first lower retardation plate and having a three-dimensional refractive index in a range of $-0.7$ to $0.7$; a liquid crystal cell formed above the lower retardation plate, the liquid crystal cell having a nematic liquid crystal layer, the nematic liquid crystal layer having a twist angle set in a range of $0°$ to $70°$; an upper retardation plate formed above the liquid crystal cell; and an upper polarizer formed above the upper retardation plate.

The above-described liquid crystal display device is suitably applied to a transflective liquid crystal display device, and is configured to have a first lower retardation plate made of a discotic liquid crystal film with hybrid alignment disposed between the lower polarizer and the liquid crystal cell where the twist angle of the liquid crystal is set to $0°$ to $70°$, and a second lower retardation plate made of a polymer film having a three-dimensional refractive index anisotropy disposed below the first lower retardation plate. The tilt of the liquid crystal layer is compensated by the first lower retardation plate made of the discotic liquid crystal film with hybrid alignment, and a phase difference is given in a thickness direction of the liquid crystal cell by the second lower retardation plate made of the polymer film having the three-dimensional refractive index anisotropy, so that the refractive index of a whole structure of these layers can be made uniform in a three-dimensional manner, which allows the viewing angle dependency to be decreased. Accordingly, the liquid crystal display device may allow a wide viewing angle to be implemented, which leads to an increase in the amount of display light and the enhancement of the contrast in the transmissive display mode.

In a preferable example of the above-described liquid crystal display device, the first lower retardation plate has a hybrid alignment axis in a range of $85°$ to $95°$ in a counterclockwise direction with respect to a reference direction when the first lower retardation plate is seen from the top. In addition, the second lower retardation plate has a phase retardation axis in a range of $85°$ to $95°$ in a counterclockwise direction with respect to the reference direction when the second lower retardation plate is seen from the top.

In one aspect of the above-described liquid crystal display device, the upper retardation plate has first and second upper retardation plates whose phase retardation axes are different in their direction from each other as seen from the top and which are made of a low dispersion film. In another aspect, a single retardation plate made of a reverse wavelength dispersion film may be employed instead of the two retardation plates made of a low dispersion film. Accordingly, the number of the retardation plate can be reduced, which allows the liquid crystal display device to be thinly fabricated.

In still another aspect of the above-described liquid crystal display device, the upper retardation plate has a first upper retardation plate made of a discotic liquid crystal film with hybrid alignment, and a second upper retardation plate made of a polymer film having a three-dimensional refractive index anisotropy, and the second upper retardation plate is disposed above the first retardation plate. In this aspect, a combination of the retardation plate made of a discotic liquid crystal film with hybrid alignment and the retardation plate made of polymer film having a three-dimensional refractive index anisotropy is disposed not only below the liquid crystal cell but also above the liquid crystal cell, so that the viewing angle can be further improved.

In a preferable example of the above-described liquid crystal display device, the liquid crystal cell is a transflective liquid crystal cell having a partially reflecting layer, and the thickness of the nematic liquid crystal layer in a reflecting portion corresponding to the partially reflecting layer is smaller than that of the nematic liquid crystal layer in a transmitting portion other than the reflecting portion. By employing such a so-called multi gap structure, the retardation between the reflecting display portion and the transmissive display portion can be optimized in the transflective liquid crystal display device, which allows the display quality to be enhanced in the transmitting mode.

The liquid crystal display device according to the present invention may be suitably applied to an electronic apparatus having a display unit, such as a portable telephone, a notebook computer, a portable television, a portable digital assistant (PDA), and so forth.

BRIEF DESCRIPTION OF THE DRAWINGS

FIGS. 11A, 11B, and 11C are tables illustrating an axial direction and so forth of each optical component in accordance with the first to third embodiments.

DETAILED DESCRIPTION

Hereinafter, preferred embodiments of the present invention will be described with reference to the accompanying drawings.

Overall Configuration of Liquid Crystal Display Device

Figure 1:
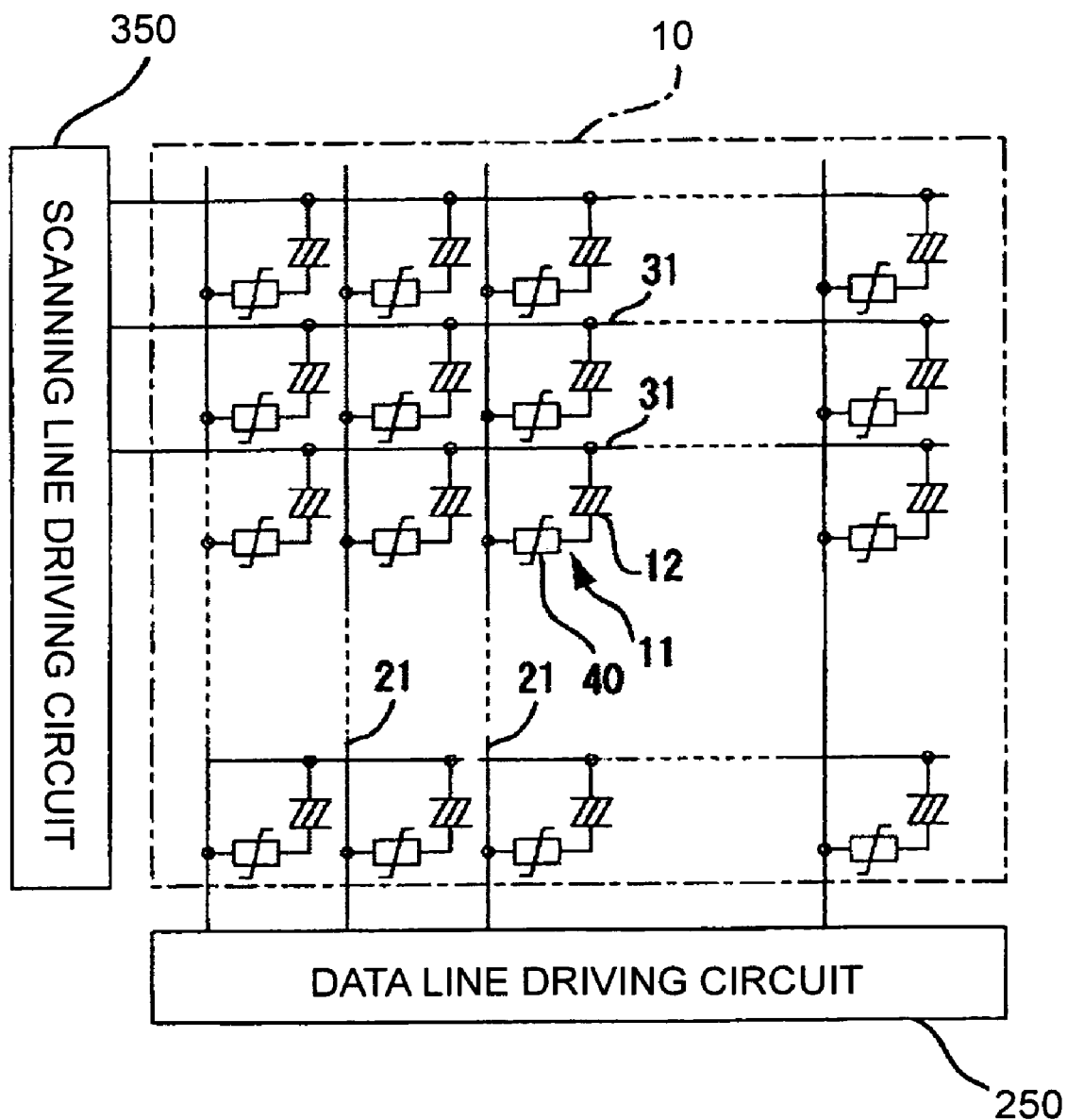
FIG. 1 is a block diagram illustrating an electrical configuration of a liquid crystal display to which the present invention is applied.
Figure 2:
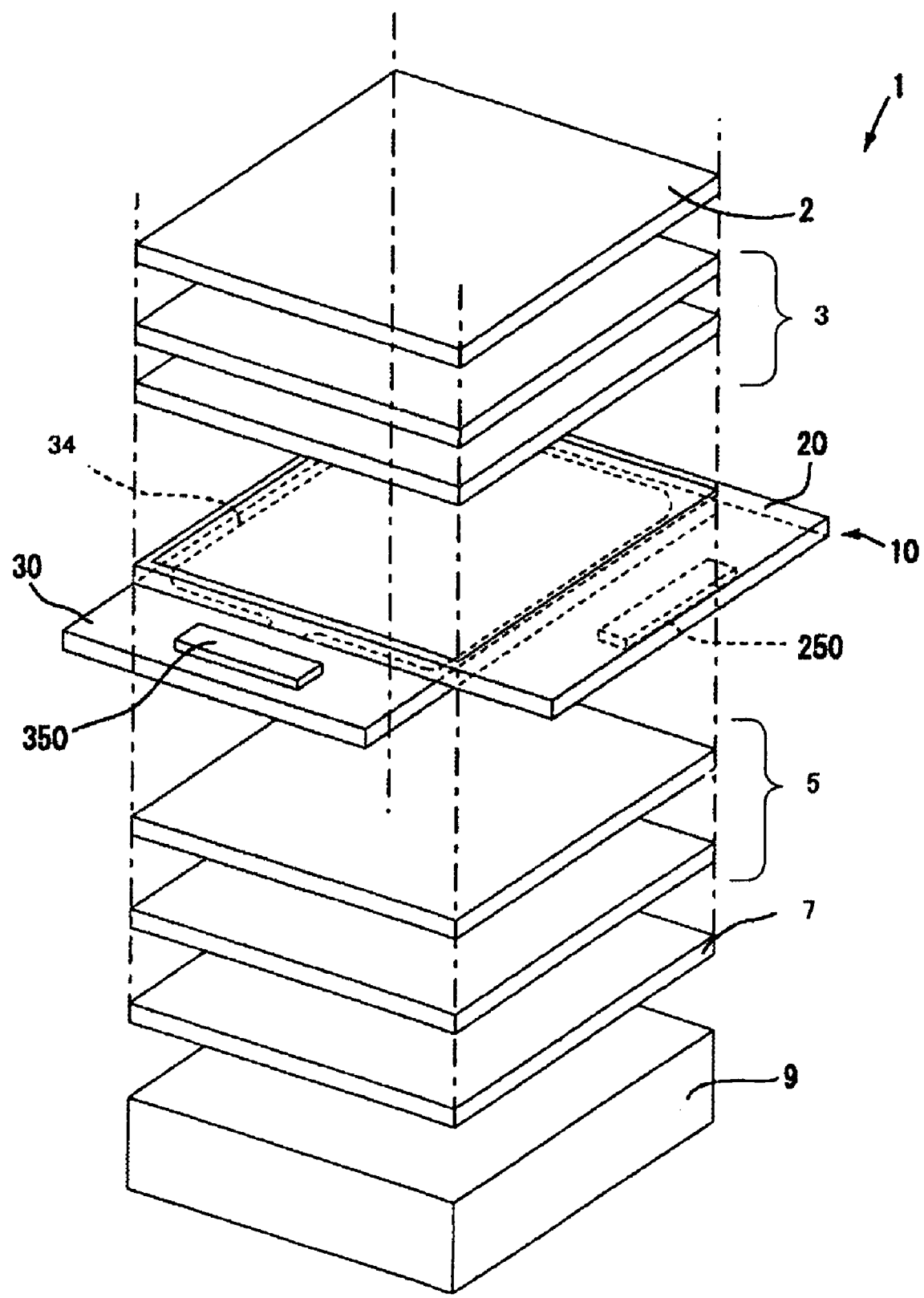
FIG. 2 is an exploded perspective view illustrating a configuration of the liquid crystal display device shown in FIG. 1.
Figure 3:
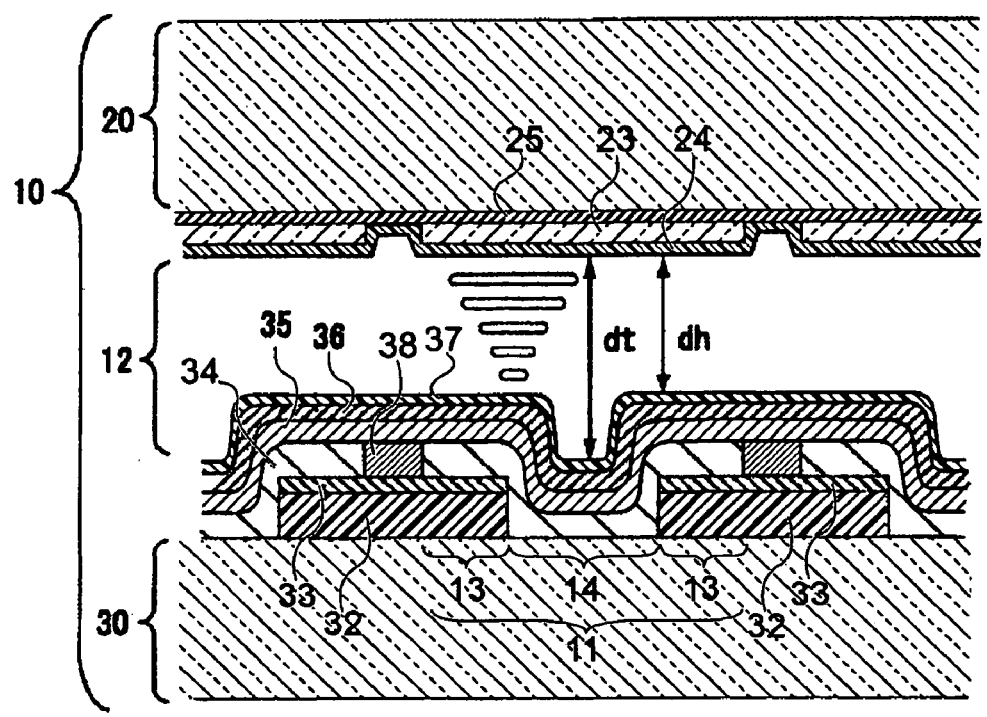
FIG. 3 is an enlarged cross-sectional view illustrating a portion of the liquid crystal display device shown in FIG. 1.
Figure 4:
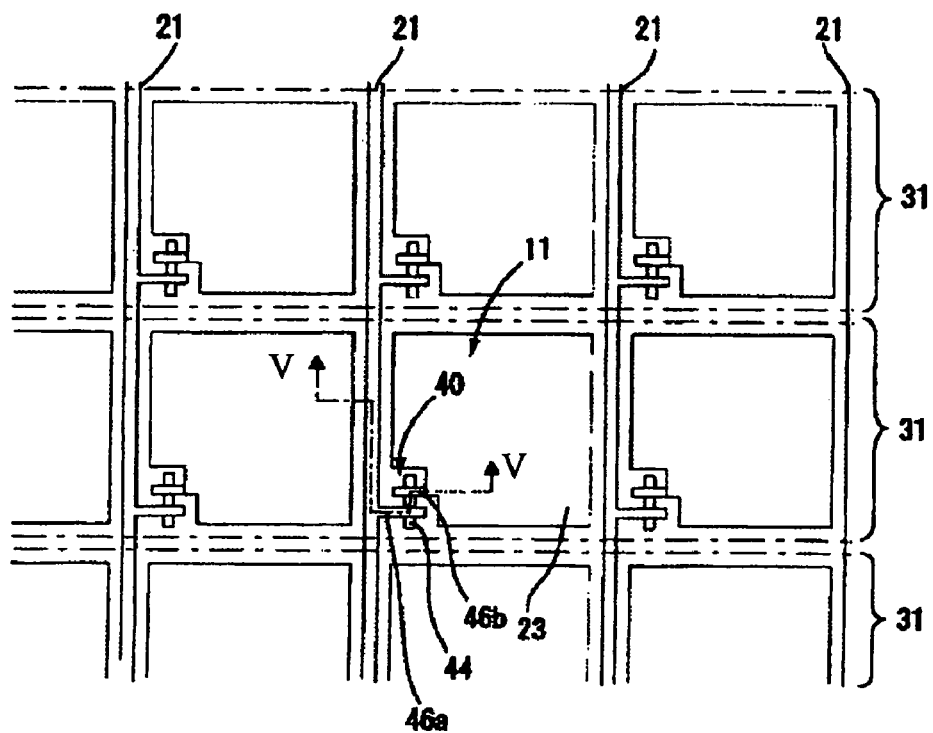
FIG. 4 is a plan view illustrating the layout of several pixels of the liquid crystal display device shown in FIG. 1.
Figure 5:
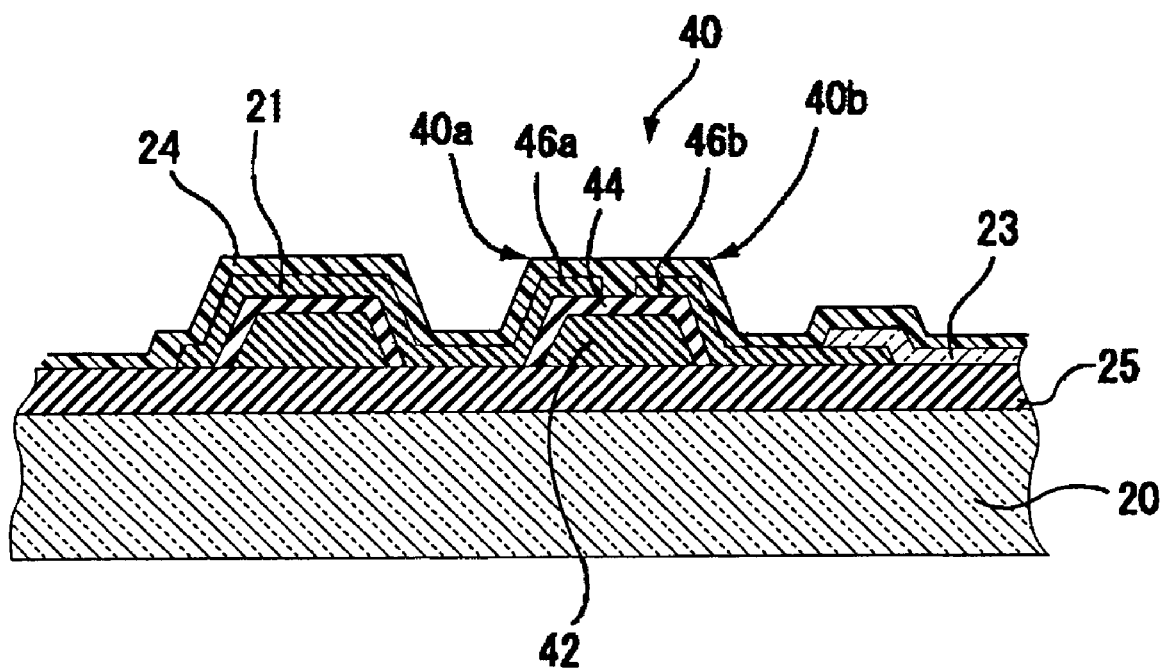
FIG. 5 is a cross-sectional view taken along the A-A' line of FIG. 4.

FIG. 1 is a block diagram illustrating an electrical configuration of the liquid crystal display device to which the present invention is applied. FIGS. 2 and 3 are an exploded perspective view of the configuration of the liquid crystal display device shown in FIG. 1, and a partially enlarged cross-sectional view thereof, respectively. FIG. 4 is a plan view illustrating the layout of several pixels including a thin film diode (TFD) in the liquid crystal display device, and FIG. 5 is a cross-sectional view taken along the line A-A' of FIG. 4.

The liquid crystal display to which the present invention is applied is an active matrix type transflective liquid crystal display device using nematic liquid crystal, wherein a plurality of scanning lines 31 is arranged in a row direction (x-direction) and a plurality of data lines 21 is arranged in a column direction (y-direction) as shown in FIG. 1. In addition, a pixel 11 is formed at each intersection of the scanning line 31 and the data line 21. A liquid crystal layer 12 formed of nematic liquid crystal and a thin film diode (TFD) element 40 as a two-terminal type active element are serially connected to each other in each pixel 11. In the present example, the liquid crystal layer 12 is connected to the scanning line 31, and the TFD element 40 is connected to the data line 21. Each scanning line 31 is driven by the scanning line driving circuit 350, and each data line 21 is driven by the data line driving circuit 250.

In the liquid crystal display device 1 as shown in FIG. 2, a driving liquid crystal cell 10 having a pair of transmitting substrates bonded to each other with predetermined spacing is used, while an upper polarizer 2, at least one upper retardation plate 3, a driving liquid crystal cell 10, a plurality of lower retardation plates 5, a lower polarizer 7, and a backlight 9 are arranged to overlap each other downward from the upper side in this order. In addition, the number of the upper retardation plate 3 is different from each other in each embodiment to be described later.

In the driving liquid crystal cell 10, the transmitting substrate on one side is an element substrate 20 where active elements are formed, and the transmitting substrate on the other side is a counter substrate 30 opposed to the element substrate 20. The element substrate 20 and the counter substrate 30 are bonded by a seal 34 including a spacer (not shown) while maintaining a predetermined gap therebetween, and a liquid crystal layer to be described layer is enclosed within the gap to be retained.

In the liquid crystal display device 1, an integrated circuit (IC) driver for driving the liquid crystal which constitutes the data line driving circuit 250 is directly mounted on a surface of the element substrate 20 by means of a chip on glass (COG) technique, and an IC (driver) for driving the liquid crystal which constitutes the scanning line driving circuit 350 is also directly mounted on a surface of the counter substrate 30. In addition, other techniques may be employed to have a connected configuration of the IC chip and the liquid crystal display device instead of the COG technique. For example, a tape automated bonding (TAB) technique may be employed to have a tape carrier package (TCP) where an IC chip is bonded on a flexible printed circuit (FPC) to be electrically connected to the liquid crystal display device. In addition, a technique of bonding the IC chip onto a hard substrate (i.e. chip on board (COB)) may be employed.

As shown in FIGS. 3 and 4, a plurality of data lines 21, a plurality of TFDs 40 connected to the data lines 21, and a pixel electrode 23 connected to each of the TFD element 40 in one-to-one manner on an inner surface of the element substrate 20. This pixel electrode 23 is formed of a transparent metal film such as an indium tin oxide (ITO). Each data line 21 extends in a straight line, and the TFD element 40 and the pixel electrode 23 are arranged in a dot matrix. An alignment film 24 is formed on the surface of the pixel electrode 23 which has been subjected to a rubbing process as one axial alignment process having conditions to be described later. This alignment film 24 is generally formed of a polyimide resin or the like.

In the meantime, a layer-thickness adjusting film for adjusting the thickness of the liquid crystal layer 12 in the transmissive display region 14 and the thickness of the liquid crystal layer 12 in the reflective display region 13, a partially reflecting layer 33 formed of a single layer or a multi-layer made of aluminum, aluminum alloy, silver, silver alloy, etc. or laminated layers thereof, a color filter 34, an overcoat layer 35, a belt-shaped counter electrode 36 formed of a transparent metal film such as ITO or the like, and an alignment film 37 are formed on an inner surface of the counter substrate 30.

Among these layers, the layer-thickness adjusting film 32 and the partially reflecting layer 33 are selectively formed in the reflective display region 13 of the pixel 11, and are not formed in the transmissive display region 14.

The color filter 34 has three colored layers of red (R), green (G), and blue (B) colors. A black matrix 38 is formed in a gap between each colored layer, and is configured to block lights incident from the gaps of the colored layers. The overcoat layer 35 is formed for the purpose of increasing the smoothness of the black matrix 38 and the color filter 34 in the surface of the black matrix 38 and the color filter 34 to thereby prevent disconnection of the counter electrode 36. In this case, the counter electrode 36 functions as a scanning line 31, and is formed in a direction orthogonal to the data line 21.

The alignment film 37 which has been subjected to a rubbing process such as one axial rubbing process is formed in the surface of the counter electrode 36 using conditions to be described later. This alignment film 37 is generally formed of polyimide resin or the like.

As shown in FIGS. 4 and 5, on an insulating film 25 formed on the surface of the element substrate 20, the TFD element 40 has a first TFD element 40a and a second TFD element 40b, and is formed of a first metal film 42, an oxide film 44 as an insulator formed by anodization on the surface of the first metal film 42, and second metal films 46a and 46b formed on the surface and spaced from each other. In addition, the second metal film 46a functions as the data line 21 while the second metal film 46b is connected to the pixel electrode 23 formed of an ITO film or the like.

The first TFD element 40a is formed of the second metal film 46a, the oxide film 44, and the first metal film 42 in the order as seen from the side of data line 21, and has a sandwiched structure of:

metal(conductor)/insulator/metal(conductor),
so that it has a bi-directional diode switching characteristic of positive and negative polarities. In the meantime, the second TFD element 40b is formed of the first metal film 42, the oxide film 44, and the second metal film 46b in the order as seen from the side of data line 21, and has a diode switching characteristic opposite to that of the first TFD element 40a. Accordingly, the TFD element 40 has a symmetrically nonlinear characteristic of current-voltage in the positive and negative polarities as compared to the case of using one diode. Alternatively, when such a nonlinear characteristic is not strictly required to be symmetrical, only one TFD element 40 may be employed.

In addition, the TFD element 40 is one example of the diode element, and a zinc oxide (ZnO) varistor, an element using a metal semi-insulator (MSI) or the like, a single body thereof, a serial connection thereof in a reverse direction, or a parallel connection thereof in a reverse direction may also be employed for the same.

In the liquid crystal display device 1 of the present embodiment, the layer-thickness adjusting film 32 is configured so as to meet the relationship as follows: dh<dt, wherein dh denotes the thickness of the liquid crystal layer 12 (nematic liquid crystal layer) corresponding to the reflective display region 13, and dt denotes the thickness of the liquid crystal layer 12 corresponding to the transmissive display region 14.

For example, the thickness dh of the liquid crystal layer 12 of the reflective display region 13 is set to 3.0 μm, and the thickness dt of the liquid crystal layer 12 corresponding to the transmissive display region 14 is set to 5.0 μm. Accordingly, when the birefringence of the liquid crystal molecule is 0.05, the retardation value Δnd of the reflective display region 13 is 150 nm while the retardation value Δnd of the transmissive display region 14 is 250 nm.

In the liquid crystal display device 1 configured as described above, when the reflective display is performed, external light incident from the outside of the device (i.e. the element substrate 20) are used, which are incident on the liquid crystal layer 12 from the element substrate 20 and reflected by the partially reflecting layer 33 (reflective display region 13), which are then transmitted again through the liquid crystal layer 12 and exited from the element substrate 20, thereby performing the color display in the reflecting mode. In this case, the liquid crystal of the liquid crystal layer 12 between the pixel electrode 23 and the counter electrode 36 is controlled in its alignment, so that the bright and dark display is performed.

In addition, in order to perform the transmissive display, light emitted from the backlight 9 are transmitted through the transmissive display region 14 from the counter substrate 30 to be incident on the liquid crystal layer 12, which are exited from the element substrate 20, so that the color display is performed in the transmitting mode. In this case, the liquid crystal of the liquid crystal layer 12 between the pixel electrode 23 and the counter electrode 36 is also controlled in its alignment, so that the bright and dark display is performed.

Accordingly, in the reflecting mode of these display modes, the incident light is transmitted through the liquid crystal layer 12 two times, while the transmitted light emitted from the backlight 9 is transmitted through the liquid crystal layer 12 only one time. Therefore, in consideration of the retardation of the liquid crystal layer 12, this retardation of the liquid crystal layer causes a difference in transmittance of the liquid crystal. However, according to the present embodiment, a predetermined magnitude relation is given to the thickness dh of the liquid crystal layer 12 corresponding to the reflective display region 13 and the thickness dt of the liquid crystal layer 12 corresponding to the transmissive display region 14, so that a retardation value Δnd in the reflective display region 13 is set to be higher than the retardation value Δnd in the transmissive display region 14.

In adjusting the layer thickness as described above, according to the present embodiment, a layer-thickness adjusting layer 35 formed of a photosensitive resin is selectively formed on an inner surface of the counter substrate 30, however, it is also possible to selectively etch the surface of the counter substrate 30 to form a concave portion, and to adjust the thickness of the liquid crystal layer 12 in the reflective display region 13 and the thickness of the liquid crystal layer 12 in the transmissive display region 14 by means of the concave portion.

Principle of Compensation of Viewing Angle

Figure 6A:
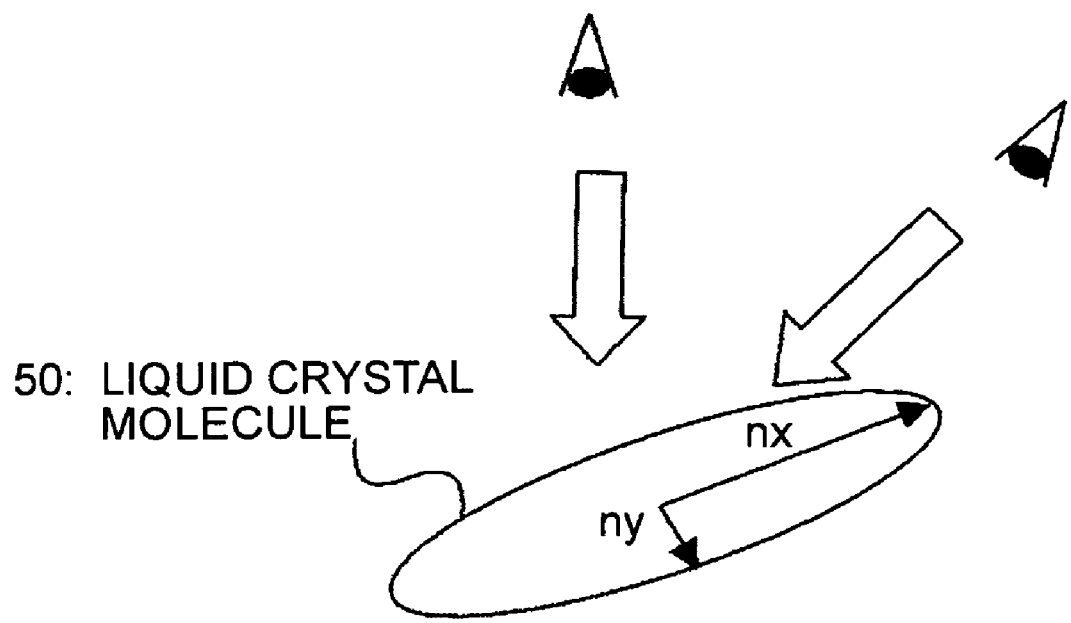
FIGS. 6A and 6B are views for explaining the principle of viewing angle compensation.
Figure 6B:
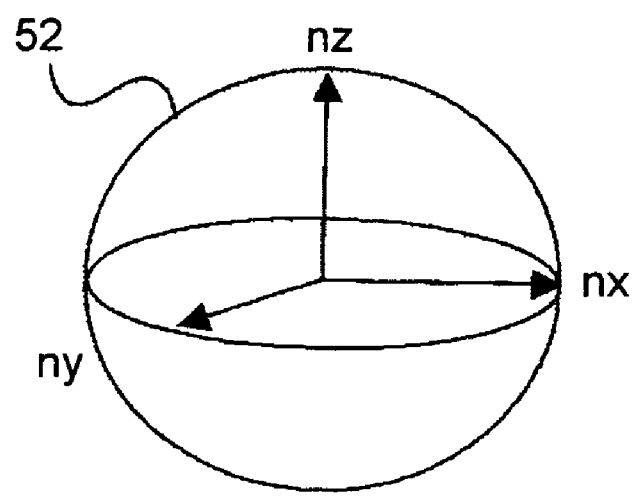

Next, the principle of compensating for the viewing angle will be described with reference to FIGS. 6 and 7. As shown in FIG. 6A, the liquid crystal molecule 50 of the nematic liquid crystal has a birefringence property, so that the refractive index of the axial direction (x direction) of the liquid crystal molecule 50 is different from that vertical to the direction (y direction). Accordingly, the optical path length of light is different from each other depending on the observation direction of the observer, which leads to a difference in contrast or brightness (that is, the viewing angle dependency is said to be high). This is the fundamental reason why the viewing angle is decreased. Accordingly, in order to improve the viewing angle, it is theoretically preferable to have the same refractive index of the liquid crystal molecule as that of the sphere 52 as schematically shown in FIG. 6B. That is, when the refractive index is constant while the observer sees the liquid crystal display device in any directions, the viewing angle dependency problem may be overcome.

Accordingly, a viewing angle compensation film is used in a pseudo manner in the present invention to thereby make the refractive index characteristic closer to that of the sphere shown in FIG. 6B. That is, a liquid crystal film and a polymer film are laminated with respect to the liquid crystal layer 12 of the liquid crystal display device 1, so that the refractive index characteristic of the whole laminate is made closer to that of the sphere in a three-dimensional manner.

Figure 7A:
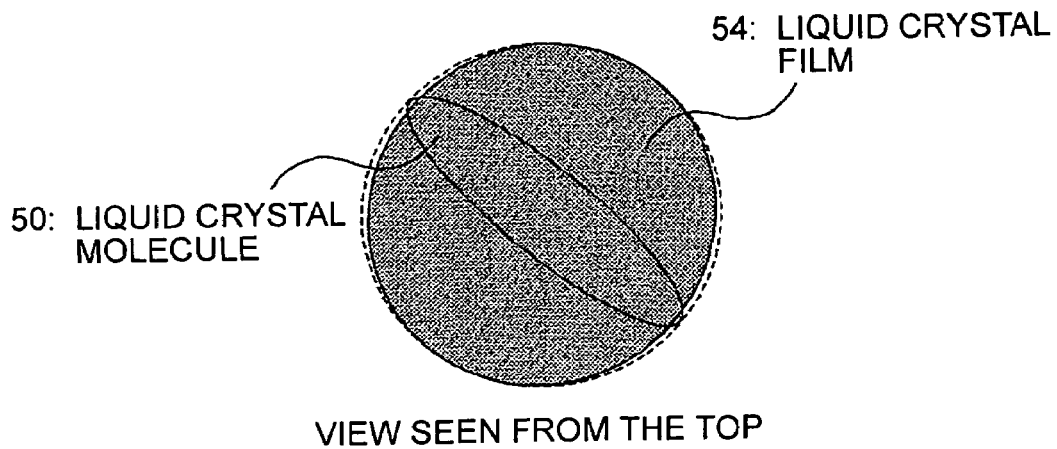
FIGS. 7A and 7B are view for explaining the principle of viewing angle compensation.
Figure 7B:
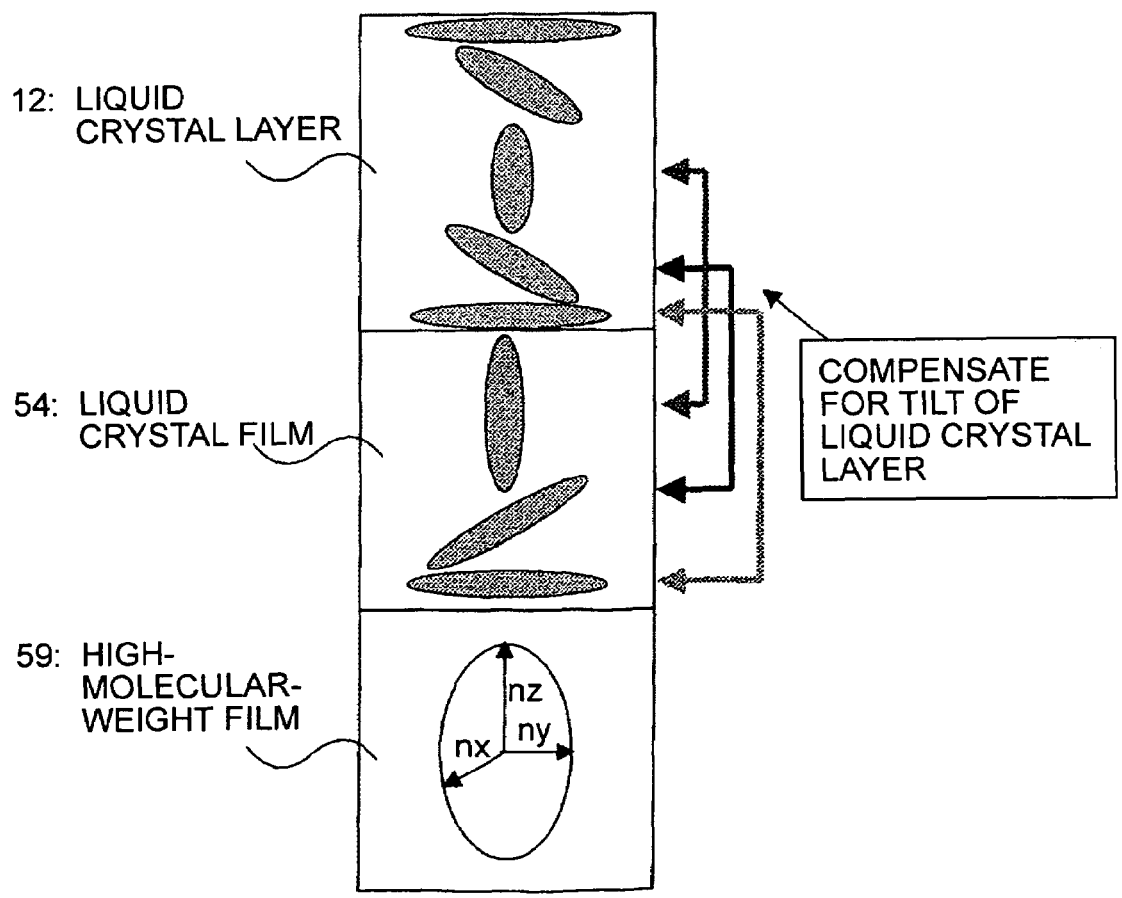

Specifically, a liquid crystal film 54 aligned in a discotic hybrid manner is first used to compensate for the tilt of the liquid crystal layer 12 of the liquid crystal display device 1 as shown in FIG. 7A. That is, the tilt of the liquid crystal layer 12 is compensated by the discotic liquid crystal constituting the liquid crystal film 54 as shown in FIG. 7B. In actual, as shown in FIG. 7B, when the laminated structure of the liquid crystal layer 12 and the liquid crystal film 54 are observed from the side, the tilt direction of the nematic liquid crystal within the liquid crystal layer 12 is made to cross the tilt direction of the discotic liquid crystal within the liquid crystal film 54, so that the tilt of the liquid crystal layer 12 is compensated.

The discotic liquid crystal constituting the liquid crystal film 54 does not have a refractive index difference within its plane (i.e. nx=ny), which thus does not have the phase differences generated at all in a z-axis direction. Accordingly, by using a polymer film 59 having a three-dimensional refractive index anisotropy as shown in FIG. 7B, the phase difference may also be generated in the z-axis direction. As such, the tilt of the liquid crystal layer 12 is compensated by the liquid crystal 54 and the phase difference is generated in the z-axis direction by the polymer film 59, so that the refractive index may be made closer to that of the sphere by the laminate of the liquid crystal 12, the liquid crystal film 54, and the polymer film 59 in a pseudo manner, which allows the viewing angle dependency to be suppressed.

FIRST EMBODIMENT

Figure 8:
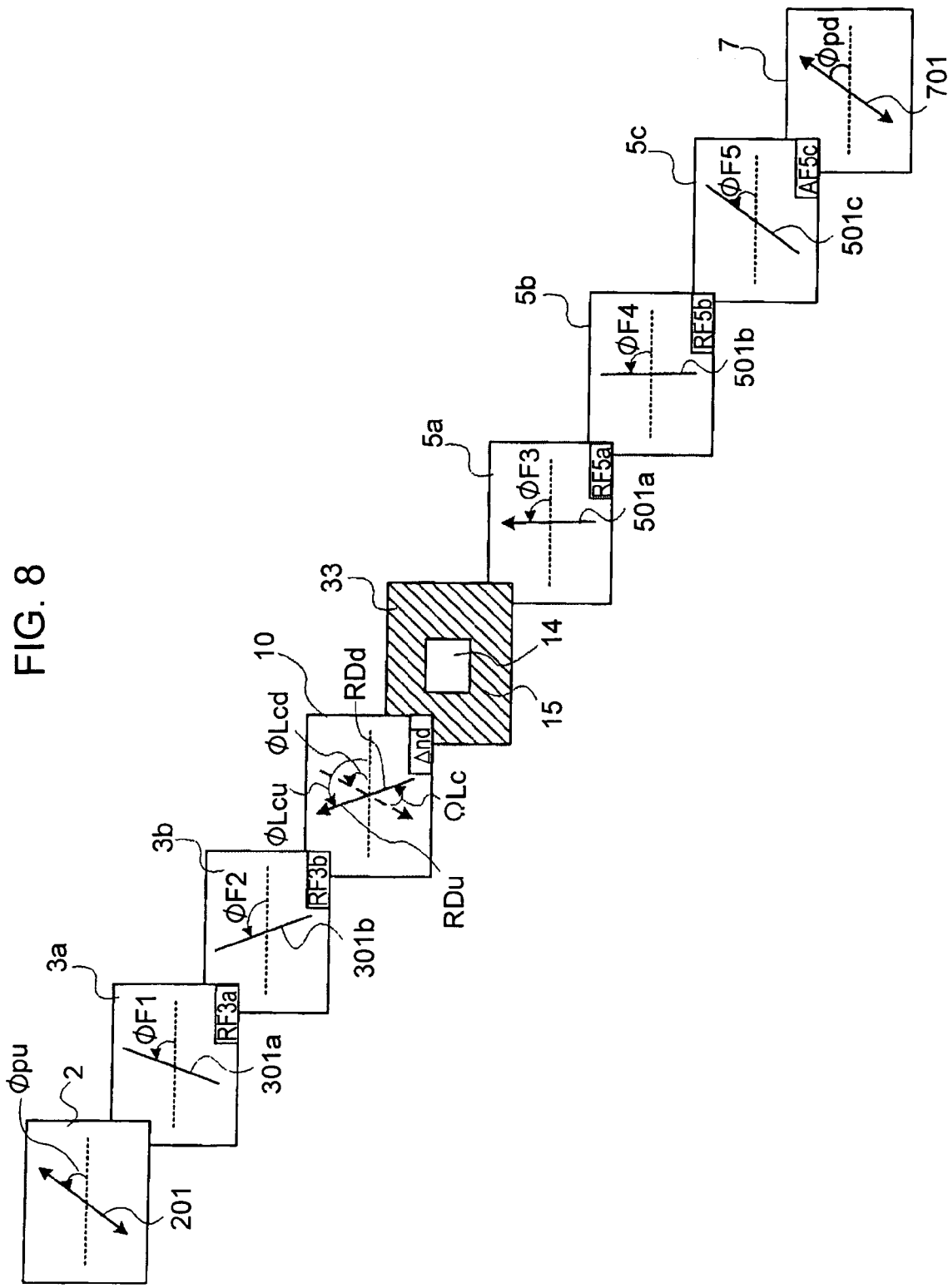
FIG. 8 is a view illustrating a laminated configuration of optical components in accordance with a first embodiment of the present invention.

Next, a first embodiment of the present invention will be described. FIG. 8 is a view for explaining an axial direction and so forth of each optical component used for the liquid crystal display device to which the present invention is applied. When the liquid crystal display device 1 is configured using the driving liquid crystal cell 10 of the present embodiment, an upper polarizer 2, upper retardation plates 3a and 3c, a driving liquid crystal cell 10, lower retardation plates 5a to 5c, a lower polarizer 7, and a backlight 9 are arranged to overlap each other in this order downward from the upper side as shown in FIGS. 2 and 8.

A low dispersion film is used for the upper retardation plates 3a and 3b and the lower retardation plate 5c. In addition, a discotic liquid crystal film as the above-described liquid crystal film 54 is used for the lower retardation plate 5a. In addition, a polymer film having a three-dimensional refractive index anisotropy as the above-described polymer film 59 is used for the lower retardation plate 5b.

The axial angle of each member shown in FIG. 8 and a phase difference value obtained by the axial angle are shown in FIG. 11A. As shown in FIG. 8, rubbing is performed on the nematic liquid crystal layer 12 in a direction in which a predetermined angle is formed with respect to the three o'clock direction shown as a broken line with respect to the element substrate 20 and the counter substrate 30, so that the twist angle $\Omega$LC is set to 0° to 70°. Specifically, the rubbing direction of the element substrate 20 (upper substrate) of the liquid crystal cell 10 is set to an angle $\phi$Lcu in a counterclockwise direction from the reference direction, and the rubbing direction of the counter substrate 30 (lower substrate) is set to an angle $\phi$Lcd in a counterclockwise direction from the reference direction. As shown in FIG. 11A, the angle $\phi$Lcu is in a preferable range of 80° to 130°, and particularly preferably about 90°. In addition, the angle $\phi$Lcd is in a preferable range of 230° to 270°, and particularly preferably about 270°.

In addition, all angles are indicated in a counterclockwise direction from the reference directions shown as broken lines in the following description.

The polarizer 2 where the absorbing axis 201 has an angle $\phi$pu with respect to the reference direction as seen from the top, is employed. The angle $\phi$pu is in a preferable range of −80° to 80°, and particularly preferably about 15°.

A low dispersion film where a phase retardation axis 301a has an angle $\phi$F1 with respect to the reference direction as seen from the top, is used as the upper retardation plate 3a. The angle $\phi$F1 is in a preferable range of −60° to 60°, and particularly preferably about 30°. In addition, the phase difference RF3a due to the lower retardation plate 3a is in a preferable range of 220 nm to 290 nm, and particularly preferably about 260 nm. The low dispersion film has a lower refractive index when the measured wavelength becomes shorter. In addition, the same configuration is applied to the upper retardation plate 3b and the lower retardation plate 5c.

A low dispersion film where a phase retardation axis 301b has an angle $\phi$F2 with respect to the reference direction as seen from the top, is used as the upper retardation plate 3b. The angle $\phi$F2 is in a preferable range of 45° to 135°, and particularly preferably about 90°. In addition, the phase difference RF3b due to the lower retardation plate 3b is in a preferable range of 50 nm to 140 nm, and particularly preferably about 90 nm.

A discotic liquid crystal film with hybrid alignment where a hybrid alignment axis 501a has an angle $\phi$F3 with respect to the reference direction is used as the lower retardation plate 5a. The angle $\phi$F3 is in a preferable range of 85° to 95°, and particularly preferably about 90°. The phase difference RF5a due to the lower retardation plate 5a is in a preferable range of 10 nm to 40 nm, and particularly preferably about 26 nm.

A polymer film where the phase retardation axis 501b has an angle $\phi$F4 with respect to the reference direction is used as the lower retardation plate 5b. The angle $\phi$F4 is in a preferable range of 85° to 95°, and particularly preferably about 90°. The phase difference RF5b due to the lower retardation plate 5b is in a preferable range of 80 nm to 150 nm, and particularly preferably about 130 nm. In addition, the lower retardation plate 5b preferably has a three-dimensional refractive index Nz set as $-0.7<Nz=(nx-nz)/(nx-ny)<0.7$.

A low dispersion film where the phase retardation axis 501c has an angle φF5 with respect to the reference direction is used as the lower retardation plate 5c. The angle φF5 is in a preferable range of −60° to 60°, and particularly preferably about 150°(=−30°). The phase difference RF5c due to the lower retardation plate 5c is in a preferable range of 220 nm to 290 nm, and particularly preferably about 270 nm.

The lower polarizer 7 is preferably used wherein the absorbing axis 701 has an angle φpd with respect to the reference direction. The angle φpd is in a preferable range of 45° to 135°, and particularly preferably about 75°.

It was found that the viewing angle characteristic was improved two times or more in the transmitting mode when the display performance was measured with respect to the liquid crystal display device 1 having the above-mentioned configuration. In addition, the color variation due to the viewing angle was reduced, which allowed the contrast to be increased two times or more.

SECOND EMBODIMENT

Figure 9:
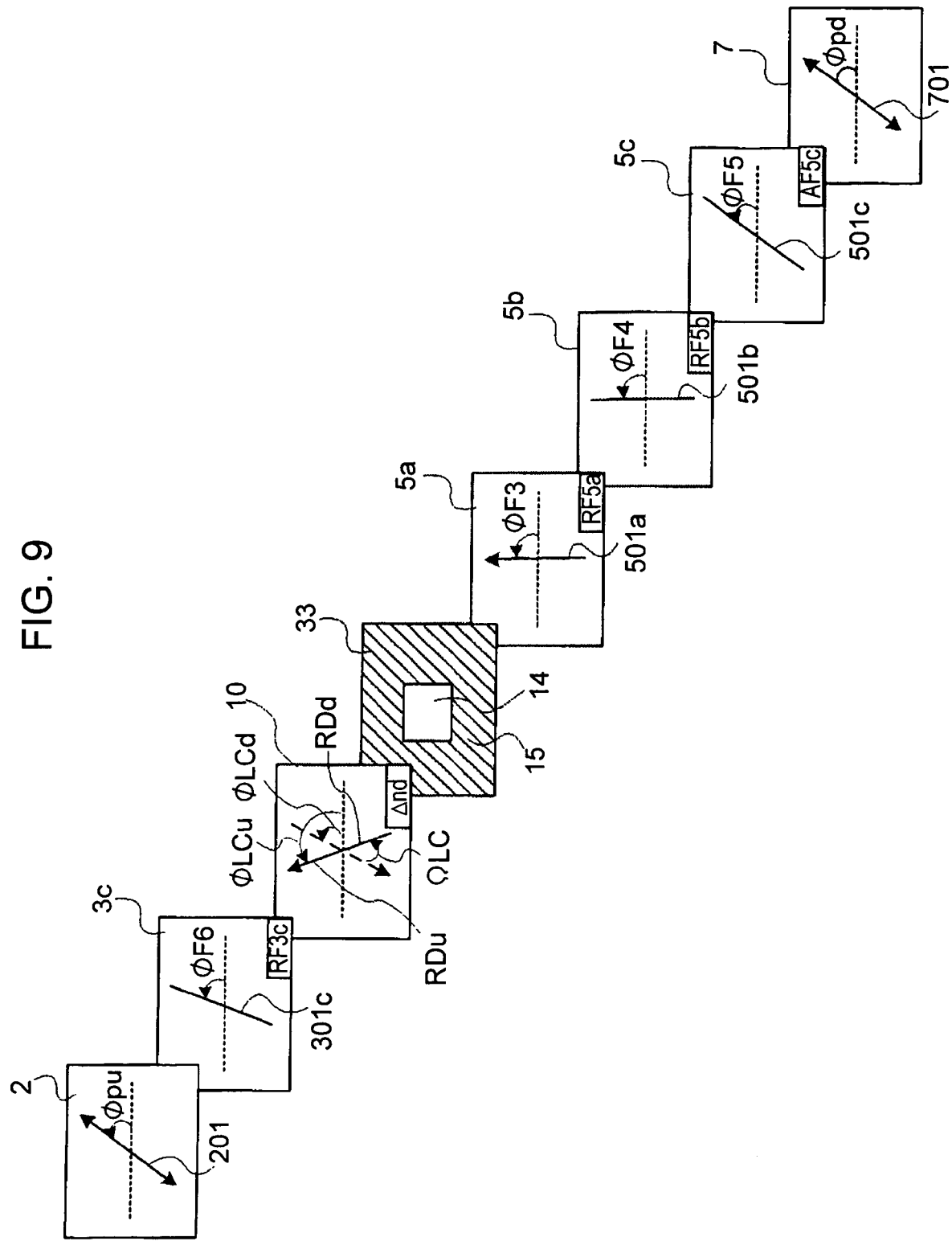
FIG. 9 is a view illustrating a laminated configuration of optical components in accordance with a second embodiment of the present invention.

Next, a third embodiment will be described. FIG. 9 is a view for explaining an axial direction or the like of each optical component using a liquid crystal display device according to the second embodiment. In order to fabricate the liquid crystal display device 1 using the driving liquid crystal cell 10 of the present embodiment, an upper polarizer 2, an upper retardation plate 3c, a driving liquid crystal cell 10, lower retardation plates 5a to 5c, a lower polarizer 7, and a backlight 9 are arranged to overlap each other in this order downward from the upper side as shown in FIG. 9. Compared with the configuration of the first embodiment, the upper retardation plate 3c is used in the second embodiment instead of the upper retardation plates 3a and 3b in the first embodiment. The other configuration is same as that of the first embodiment. That is, the configuration of the upper polarizer 2, the liquid crystal 10, the lower retardation plates 5a to 5c, and the lower polarizer 7 is same as that of the first embodiment, so that its description will be skipped. The axial angle of each member shown in FIG. 9 and a phase difference value obtained therefrom are shown in FIG. 11B.

A retardation plate of a reverse wavelength diffusion type, which shows a lower phase difference value in the shorter wavelength in a measurement wavelength range of 400 nm to 700 nm, is used as the upper retardation plate 3c in the second embodiment. By means of this configuration, the upper retardation plate may be configured with one sheet. A reverse wavelength diffusion film wherein the phase retardation axis 301c has an angle φF6 with respect to the reference direction as seen from the top, is used as the upper retardation plate 3c. The angle φF6 is in a preferable range of −60° to 60°, and particularly preferably about 50°. In addition, the phase difference RF3c due to the upper retardation plate 3c is in a preferable range of 100 nm to 200 nm, and particularly preferably about 170 nm.

As such, according to the second embodiment, the lower retardation plate 5a to 5c and the lower polarizer 7 which are disposed below the liquid crystal cell 10 are same as that of the first embodiment, so that the same effect of improving the viewing angle is obtained as the first embodiment. In addition, a reverse wavelength diffusion film is used in the second embodiment to allow one sheet of the upper retardation plate to be employed, which may lead to the thin liquid crystal display device 1 by its reduced thickness.

THIRD EMBODIMENT

Figure 10:
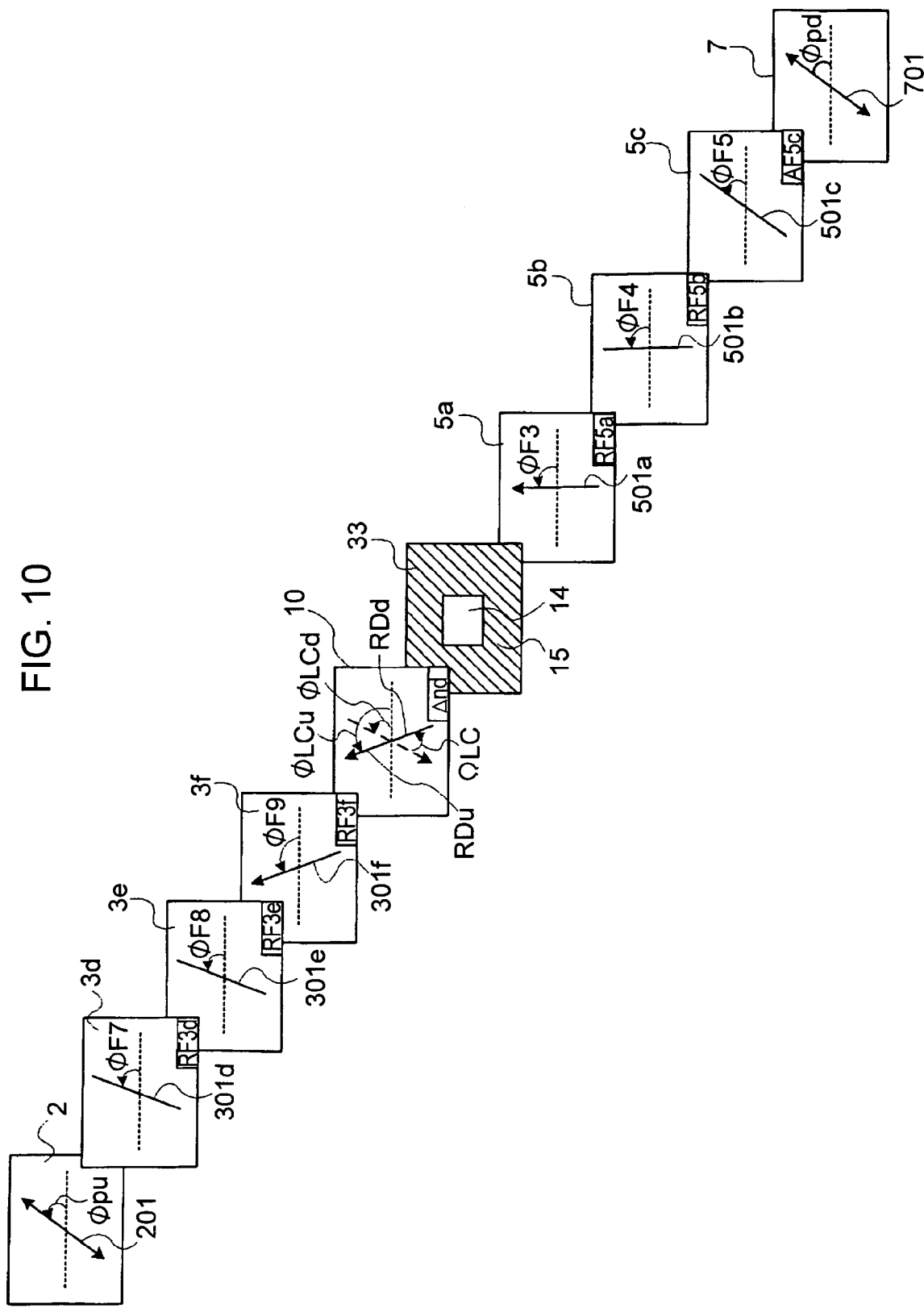
FIG. 10 is a view illustrating a laminated configuration of optical components in accordance with a third embodiment of the present invention.

Next, a third embodiment will be described. FIG. 10 is a view for explaining an axial direction or the like of each optical component using a liquid crystal display device according to the third embodiment. In order to fabricate the liquid crystal display device 1 using the driving liquid crystal cell 10 of the present embodiment, an upper polarizer 2, upper retardation plates 3d to 3f, a driving liquid crystal cell 10, lower retardation plates 5a to 5c, a lower polarizer 7, and a backlight 9 are arranged to overlap each other in this order downward from the upper side as shown in FIG. 10. Compared with the configuration of the first embodiment, the upper retardation plates 3d to 3f are used in the third embodiment instead of the upper retardation plates 3a and 3b in the first embodiment. The other configuration is same as that of the first embodiment. That is, the configuration of the upper polarizer 2, the liquid crystal 10, the lower retardation plates 5a to 5c, and the lower polarizer 7 is same as that of the first embodiment, so that its description will be skipped. The axial angle of each member shown in FIG. 10 and a phase difference value obtained therefrom are shown in FIG. 11C.

In the present embodiment, a configuration improving the viewing angle by using a discotic liquid crystal film with hybrid alignment and a polymer film having a three-dimensional refractive index anisotropy, namely, the same configuration as that of the lower retardation plates 5a to 5c is also employed for upper retardation plates. However, the laminating order is symmetric with the liquid crystal cell 10 being a reference. Specifically, the upper retardation plate 3f uses a discotic liquid crystal film with hybrid alignment which is same as that of the lower retardation plate 5a, and the upper retardation plate 3e uses a polymer film having a three-dimensional refractive index anisotropy which is same as that of the lower retardation plate 5b, and the upper retardation plate 3d uses a low dispersion film which is same as that of the upper retardation plate 3d.

A low dispersion film wherein the phase retardation axis 301d has an angle φF7 with respect to the reference direction is used as the upper retardation plate 3d. The angle φF7 is in a preferable range of −60' to 60°, and particularly preferably about 30°. The phase difference RF3d due to the upper retardation plate 3d is in a preferable range of 220 nm to 290 nm, and particularly preferably about 265 nm.

A polymer film having the three-dimensional refractive index anisotropy is used as the upper retardation plate 3e wherein the phase retardation axis 301e has an angle φF8 with respect to the reference direction. The angle φF8 is in a preferable range of 45° to 135°, and particularly preferably about 90°. The phase difference RF3e due to the upper retardation plate 3e is in a preferable range of 50 nm to 140 nm, and particularly preferably about 130 nm.

A discotic liquid crystal film with hybrid alignment is used as the upper retardation plate 3f wherein the hybrid alignment axis 301f has an angle φF9 with respect to the reference direction. The angle φF9 is in a preferable range of 45° to 135°, and particularly preferably about 90°. The phase difference RF3f due to the upper retardation plate 3f is in a preferable range of 10 nm to 40 nm, and particularly preferably about 30 nm.

According to the present embodiment, a combination of the discotic liquid crystal film with hybrid alignment and a polymer film having a three-dimensional refractive index anisotropy is provided in both of the upper and lower positions of the liquid crystal cell 10, so that the viewing angle characteristic may be further improved in the transmitting mode. Specifically, it was found that the viewing angle characteristic was improved two and a half times or more in the transmitting mode when the display performance was measured with respect to the liquid crystal display device 1 having the above-mentioned configuration. In addition, the color variation due to the viewing angle was reduced, which allowed the contrast to be increased two times or more.

Comparison of Viewing Angle with Conventional Configuration

FIG. 12 shows the viewing angle characteristics of the configuration according to the above-mentioned embodiment and the conventional configuration. FIG. 12A shows the viewing angle characteristic of the liquid crystal display device 1 according to the first embodiment. In addition, FIG. 12B shows the viewing angle characteristic of the liquid crystal display device using the optical compensation film substantially formed of a liquid crystalline polymer representing a positive one axial property optically wherein the liquid crystalline polymer has fixed the nematic hybrid alignment formed in the liquid crystal state.

Figure 12A:
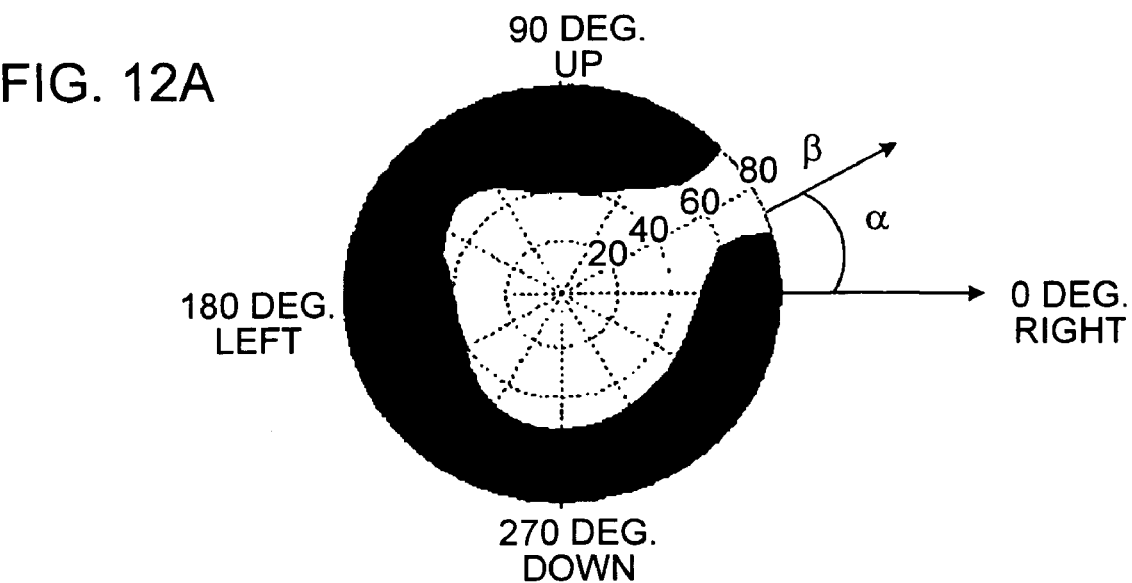
FIGS. 12A, 12B, 12C, and 12D are graphs illustrating a viewing angle characteristic as compared to the related art.
Figure 12B:
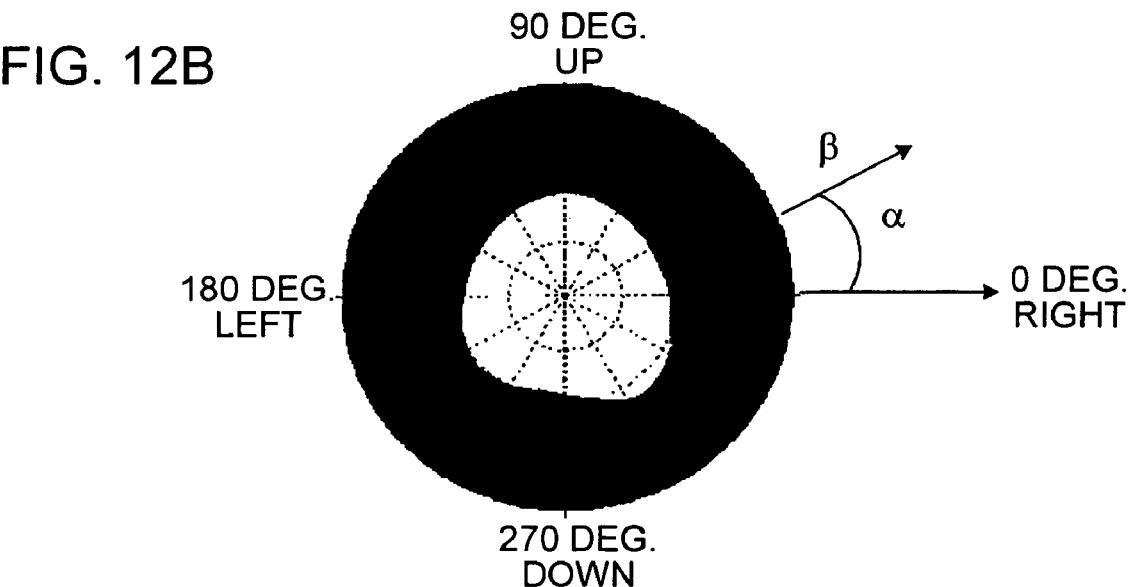
Figure 12C:
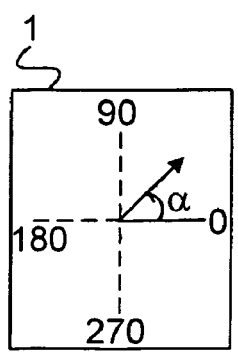
Figure 12D:
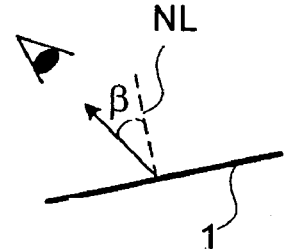

In addition, referring to FIGS. 12A and 12B, a circle graph representing the viewing angle characteristic has an azimuth angle α in a circumferential direction and an elevation angle β in a radial direction. Specifically, the right (three o'clock) direction of the circle graph is set to a reference direction (i.e. the azimuth angle α=0), and the azimuth angle α is indicated in a counterclockwise direction from the reference. The azimuth angle α indicates the angle of deviation in up, down, left and right directions of an observer as shown in FIG. 12C. In addition, the elevation angle β indicates an angle where the line of sight of the observer is formed with respect to the normal line NL of the liquid crystal display device 1 as shown in FIG. 12D. Referring to FIGS. 12A and 12B, the length of the circle in the radial direction indicates the elevation angle β. Specifically, concentric circles denoted by broken lines in the circle graph of FIG. 12A indicate elevation angles corresponding to 20°, 40°, 60°, and 80° from an inner circumferential side of the broken line. In addition, referring back to FIGS. 12A and 12B, a white area has a contrast not less than 10, and a black area has a contrast less than 10. In general, when the viewing angle is evaluated, the contrast of 10 often becomes a reference for determining the visibility as a good state, and the circle graphs shown in FIGS. 12A and 12B are also classified into the white area and the black area by color with the contrast of 10 being a boundary thereof.

As can be seen from the comparison of FIG. 12A and FIG. 12B, the white area spreads toward the outer circumferential side of the circle in the viewing angle characteristic of the liquid crystal display device 1 of the first embodiment shown in FIG. 12A as compared to the viewing angle characteristic of the conventional configuration shown in FIG. 12B. That is, it can be understood that the viewing angle is improved in all directions. Specifically, the contrast becomes 10 or more till the elevation angle of about 40° in almost all directions in the viewing angle characteristic of the conventional configuration shown in FIG. 12B, whereas the contrast is degraded to less than 10 when the elevation angle exceeds 40°. On the contrary, the azimuth is increased which maintains the contrast not less than 10 till the elevation angle of about 50° in the viewing angle characteristic of the first embodiment shown in FIG. 12A. As such, the viewing angle is improved in all directions according to the liquid crystal display device of the present embodiments.

In addition, FIG. 12 shows only the viewing angle characteristic of the liquid crystal display device 1 according to the first embodiment, however, the viewing angle is also improved in the liquid crystal display device according to the second and third embodiments.

OTHER EMBODIMENT

In addition, the TFD element 40 is used as the active element in the above-mentioned embodiments, the present invention may also be applied to the liquid crystal display device using a thin film transistor (TFT) instead of the TFD.

In addition, the liquid crystal is twisted by the alignment film which has been rubbed in the above-mentioned embodiment, however, the liquid crystal may be twisted by other method. For example, the alignment film may be fabricated depositing a silicon oxide or the like on the surface of the substrate obliquely. In addition, after a photo-curable resin is coated on the substrate, the intensity of light may be adjusted in a stripe to use the photo-curable resin layer which has been exposed and cured as an alignment film.

Electronic Apparatus

Figure 13:
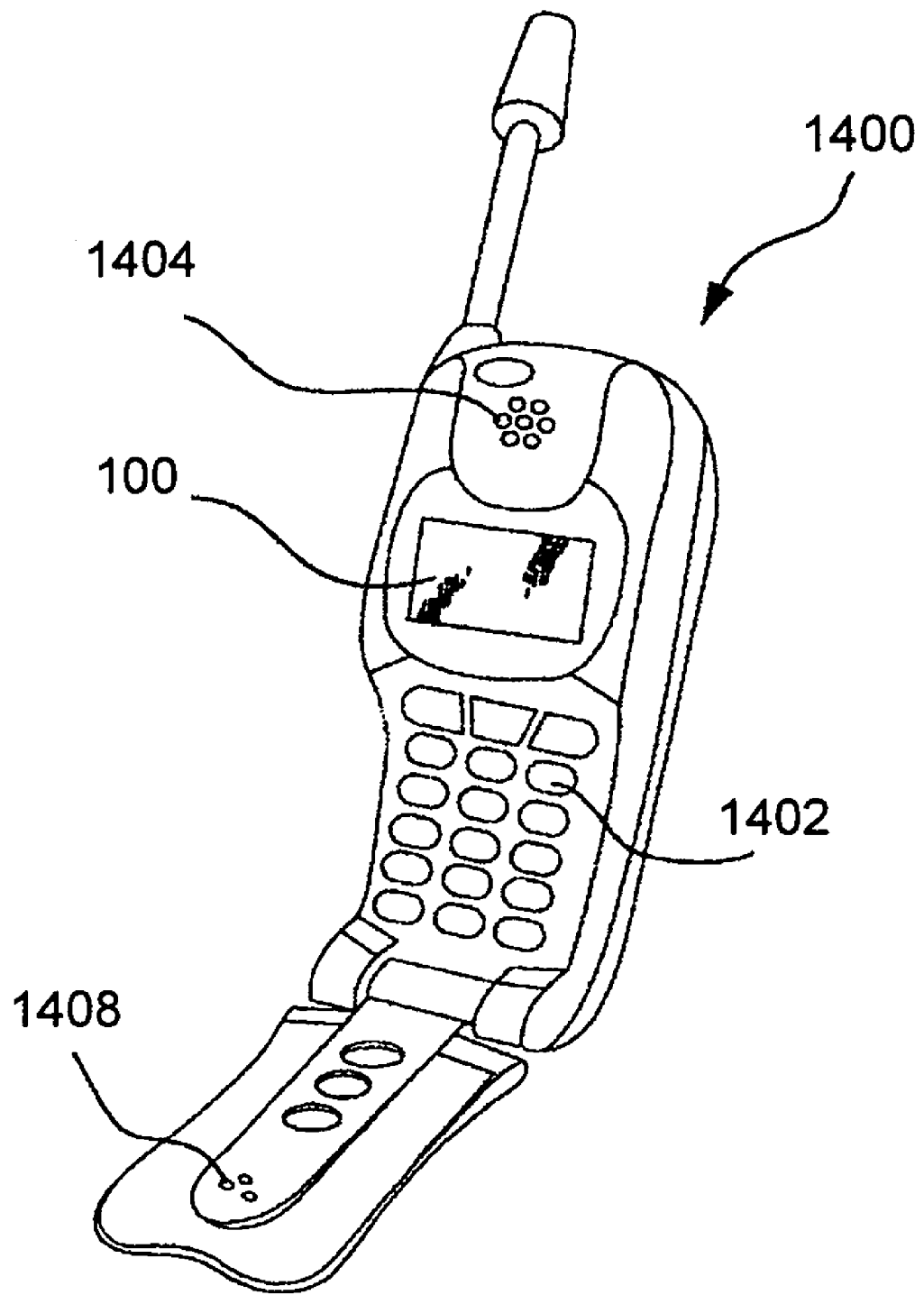
FIG. 13 is a perspective view illustrating an example of an electronic apparatus using the liquid crystal display device of the present invention.

FIG. 13 is a perspective view illustrating a configuration of a portable telephone as an example of an electronic apparatus to which the liquid crystal display device 1 of the present invention is mounted.

Referring to FIG. 13, a portable telephone 1400 has an earpiece 1404, a mouthpiece 1406, and a liquid crystal display 1 as well as a plurality of operation buttons 1402. A backlight is also mounted on the back of the liquid crystal display 1 if necessary.

In addition to the portable telephone, a mobile computer, a liquid crystal television, a view finder type or monitor direct-view type video tape recorder, a car navigation apparatus, an electronic note, an electronic calculator, a word processor, a workstation, a picture phone, a point-of-sale (POS) terminal, or an apparatus having a touch panel may employed as the electronic apparatus which may mount the liquid crystal display device of the present embodiment.

What is claimed is:

1. A liquid crystal display device comprising:
   a lower polarizer;
   a lower retardation plate formed above the lower polarizer, the lower retardation plate having a first lower retardation plate made of a discotic liquid crystal film with hybrid alignment and a second lower retardation plate made of a polymer film having a three-dimensional refractive index anisotropy, the second lower retardation plate being disposed below the first lower retardation plate and having a three-dimensional refractive index in a range of −0.7 to 0.7;
   a liquid crystal cell formed above the lower retardation plate, the liquid crystal cell having a nematic liquid crystal layer, the nematic liquid crystal layer having a twist angle set in a range of 0° to 70°;
   an upper retardation plate formed above the liquid crystal cell; and
   an upper polarizer formed above the upper retardation plate,
   wherein the user retardation plate has first and second upper retardation plates whose phase retardation axes are different in their direction from each other as seen from the to and which are made of a low dispersion film.

2. The liquid crystal display device according to claim 1, wherein the first lower retardation plate has a hybrid alignment axis in a range of 85° to 95° in a counterclockwise direction with respect to a reference direction when the first lower retardation plate is seen from the top.

3. The liquid crystal display device according to claim 2, wherein the second lower retardation plate has a phase retardation axis in a range of 85° to 95° in a counterclockwise direction with respect to the reference direction when the second lower retardation plate is seen from the top.

4. The liquid crystal display device according to claim 1, wherein the upper retardation plate has a first upper retardation plate made of a discotic liquid crystal film with hybrid alignment, and a second upper retardation plate made of a polymer film having a three-dimensional refractive index anisotropy, and the second upper retardation plate is disposed above the first upper retardation plate.

5. The liquid crystal display device according to claim 1, wherein the liquid crystal cell is a transflective liquid crystal cell having a partially reflecting layer, and the thickness of the nematic liquid crystal layer in a reflecting portion corresponding to the partially reflecting layer is smaller than that of the nematic liquid crystal layer in a transmitting portion other than the reflecting portion.

6. An electronic apparatus comprising the liquid crystal display device according to claim 1.

7. A liquid crystal display device comprising:
a lower polarizer;
a lower retardation plate formed above the lower polarizer, the lower retardation plate having a first lower retardation plate made of a discotic liquid crystal film with hybrid alignment and a second lower retardation plate made of a polymer film having a three-dimensional refractive index anisotropy, the second lower retardation plate being disposed below the first lower retardation plate and having a three-dimensional refractive index in a range of −0.7 to 0.7, the first lower retardation plate having a hybrid alignment axis in a range of 85° to 95° in a counterclockwise direction with respect to a three o'clock direction when the first lower retardation plate is seen from the top, the second lower retardation plate having a phase retardation axis in a range of 85° to 95° in a counterclockwise direction with respect to the three o'clock direction when the second lower retardation plate is seen from the top;
a liquid crystal cell formed above the lower retardation plate, the liquid crystal cell having a nematic liquid crystal layer, the nematic liquid crystal layer having a twist angle set in a range of 0° to 70, ° the liquid crystal cell including a first substrate and a second substrate in opposition with each other with the nematic liquid crystal layer disposed therebetween, the nematic liquid crystal layer having a phase difference value Δnd from 220nm to 350nm, wherein Δn is a birefringence of the liquid crystal and d is a thickness of the liquid crystal layer corresponding to a transmissive display region, the absolute value of φLcd—180°—φLcu is 0° to 70,° wherein φLcu is an angle of rubbing direction of the first substrate with respect to the three o'clock direction, the angle φLcu being 80° to 130, ° and φLcd is an angle of the rubbing direction of the second substrate with respect to the three o'clock direction;
an upper retardation plate formed above the liquid crystal cell;
an upper polarizer formed above the upper retardation plate,
wherein the upper retardation plate has first and second upper retardation plates whose phase retardation axes are different in their direction from each other as seen from the top and which are made of a low dispersion film; and
a backlight disposed to the outside of the lower polarizer so that the backlight, the lower polarizer, the lower retardation plate, the liquid crystal cell, the upper retardation plate, and the upper polarizer are juxtaposed in this order.

8. The liquid crystal display device according to claim 7, wherein the liquid crystal cell is a transflective liquid crystal cell having a partially reflecting layer, and the thickness of the nematic liquid crystal layer in a reflecting portion corresponding to the partially reflecting layer is smaller than that of the nematic liquid crystal layer in a transmitting portion other than the reflecting portion.

9. A liquid crystal display device comprising:
a lower polarizer;
a lower retardation plate formed above the lower polarizer, the lower retardation plate having a first lower retardation plate made of a discotic liquid crystal film with hybrid alignment and a second lower retardation plate made of a polymer film having a three-dimensional refractive index anisotropy, the second lower retardation plate being disposed below the first lower retardation plate and having a three-dimensional refractive index in a range of −0.7 to 0.7;
a liquid crystal cell formed above the lower retardation plate, the liquid crystal cell having a nematic liquid crystal layer, the nematic liquid crystal layer having a twist angle set in a range of 0° to 70°;
an upper retardation plate formed above the liquid crystal cell; and an upper polarizer formed above the upper retardation plate,
wherein the upper retardation plate is a single retardation plate made of a reverse wavelength dispersion film.

* * * * *